United States Patent
Deneszczuk et al.

(10) Patent No.: US 12,320,391 B2
(45) Date of Patent: Jun. 3, 2025

(54) EXTERNAL SNAP RING RETAINER

(71) Applicant: GM GLOBAL TECHNOLOGY OPERATIONS LLC, Detroit, MI (US)

(72) Inventors: Gregory William Deneszczuk, Royal Oak, MI (US); Jesus Rene Sanchez Urbina, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 251 days.

(21) Appl. No.: 17/969,130

(22) Filed: Oct. 19, 2022

(65) Prior Publication Data
US 2024/0133413 A1  Apr. 25, 2024
US 2024/0229867 A9  Jul. 11, 2024

(51) Int. Cl.
*F16B 21/18* (2006.01)
*F16C 19/16* (2006.01)
*F16C 35/063* (2006.01)

(52) U.S. Cl.
CPC .......... *F16C 35/063* (2013.01); *F16B 21/186* (2013.01); *F16C 19/16* (2013.01)

(58) Field of Classification Search
CPC ................................. F16B 21/18; F16B 21/186
USPC .......................................... 411/517, 521, 526
See application file for complete search history.

(56) References Cited

U.S. PATENT DOCUMENTS

| | | | | |
|---|---|---|---|---|
| 2,140,441 | A | * | 12/1938 | Clark ..................... H01J 19/42 70/370 |
| 4,364,615 | A | * | 12/1982 | Euler .................... F16C 35/063 384/903 |
| 5,746,517 | A | * | 5/1998 | Durham ................ F16C 35/063 384/903 |
| 5,913,504 | A | * | 6/1999 | Nishimura ............ F16K 31/122 251/62 |
| 8,251,627 | B2 | * | 8/2012 | Inoue ..................... F02M 59/44 411/517 |
| 8,827,653 | B2 | * | 9/2014 | Bouru ..................... B64C 11/48 416/204 R |
| 11,939,998 | B2 | * | 3/2024 | Linz ....................... F16B 21/186 |
| 12,006,844 | B2 | * | 6/2024 | Millier ..................... F16C 19/06 |
| 2016/0290228 | A1 | * | 10/2016 | van der Merwe ........ F01D 7/00 |

* cited by examiner

*Primary Examiner* — Flemming Saether

(57) ABSTRACT

A snap ring retainer system includes a first member having an annular groove therein. A second member is engaged with the first member. A snap ring is received in the annular groove and includes a first side engaging the second member and securing the second member to the first member. A snap ring retainer includes a first portion engaged with the first member and a second portion extending radially from the first portion and engaged with the snap ring on an opposite side from the second member.

12 Claims, 4 Drawing Sheets

… (1)

EXTERNAL SNAP RING RETAINER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a snap ring configured to secure a bearing, a gear, a clutch component, or other member to a shaft or within a housing bore and more particularly to an external snap ring retainer for securing the snap ring within its groove.

Traditional snap rings are used to inexpensively retain a member to a shaft or within a bore. However, excessive forces can cause a snap ring to spin out or walk out of the groove within the shaft or bore. Alternative, more expensive mechanisms are commonly used as an alternative to snap rings in application where a snap ring has insufficient strength to retain a member to a shaft or within a bore.

SUMMARY

According to an aspect of the present disclosure, a snap ring retainer system, includes a first member having an annular groove therein. A second member is supported by the first member. A snap ring is received in the annular groove and includes a first side engaging the second member and securing the second member to the first member. A snap ring retainer includes a first portion engaged with the first member and a second portion extending radially from the first portion and engaged with the snap ring on an opposite side from the second member.

According to a further aspect, the first member is a shaft and the second member is one of a bearing race, a gear, and a clutch component.

According to another aspect, the first member includes a shoulder spaced from the annular groove and engaged by the first portion of the snap ring retainer.

According to a further aspect, the shoulder is formed by a secondary ring received in a secondary annular groove in the first member.

According to still another aspect, the first portion of the snap ring retainer is conical with a first angle of inclination.

According to yet another aspect, the second portion of the snap ring retainer is conical with a second angle of inclination different than the first angle of inclination.

According to another aspect, the first portion of the snap ring retainer includes a plurality of cutouts at an end thereof.

According to a further example embodiment, a snap ring retainer system includes a first member having an annular groove therein. A second member is engaged with the first member. A snap ring is received in the annular groove and includes a first side engaging the second member and securing the second member to the first member. A snap ring retainer includes a first portion engaged with the first member and a second portion extending radially from the first portion and engaging a second side of the snap ring on an opposite side from the second member.

According to a further example embodiment, a snap ring retainer system, includes a housing having a bore with an annular groove therein. A first member is engaged within the bore. A snap ring is received in the annular groove and has a first side engaging the first member and secures the first member within the bore. A snap ring retainer incudes a first portion engaged with the housing and a second portion extending radially inward from the first portion and the second portion engaging a second side of the snap ring on an opposite side from the first member.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
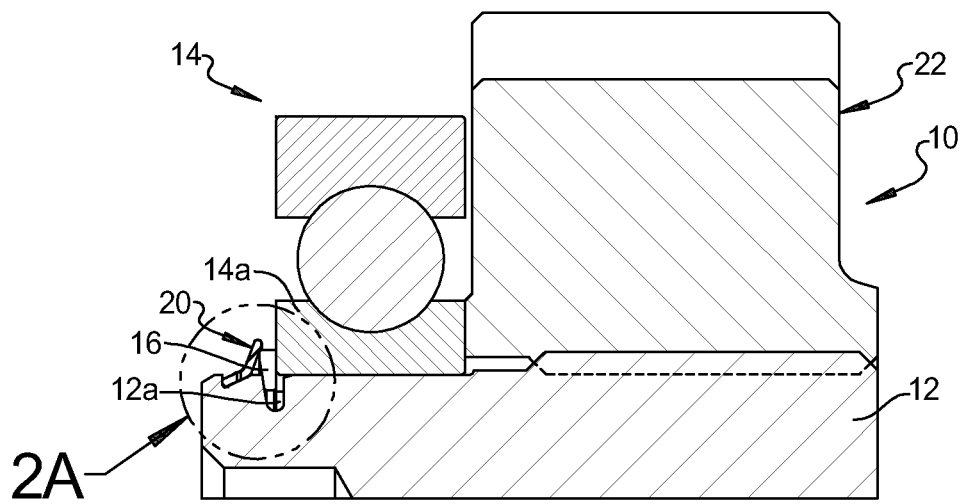
FIG. 1 is a cross-sectional view of a shaft and bearing system having a snap ring and a snap ring retainer according to the principles of the present disclosure.
Figure 2A:
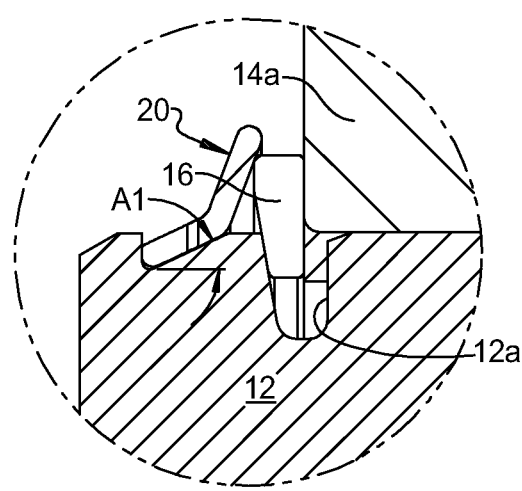
FIG. 2A is a detailed cross-sectional view of the snap ring and snap ring retainer engaged with a shaft according to the principles of the present disclosure.

With reference to FIGS. 1 and 2A, a partial cross-sectional view of an example bearing and shaft system 10 is shown. The bearing and shaft system can be utilized in a transmission or drive system of a vehicle or in other industrial applications where a bearing supports a shaft. The bearing and shaft system 10 includes a shaft 12 that receives an inner bearing race 14*a* that is secured on the shaft 12 by a snap ring 16 that is received in an annular groove 12*a* in the shaft 12, as is known in the art. A snap ring retainer 20 is mounted to the shaft 12 and is disposed against the snap ring 16 to retain the snap ring 16 within the annular groove 12*a* when the snap ring 16 is exposed to excessive forces. A gear 22 can be disposed against the inner bearing race 14*a*. The inner bearing race 14*a* is part of a bearing assembly 14 that can be received in a bore in a housing. The snap ring and snap ring retainer can be utilized in a transmission or drive system of a vehicle or in other industrial applications where a snap ring is used to support a member to a shaft.

Figure 3:
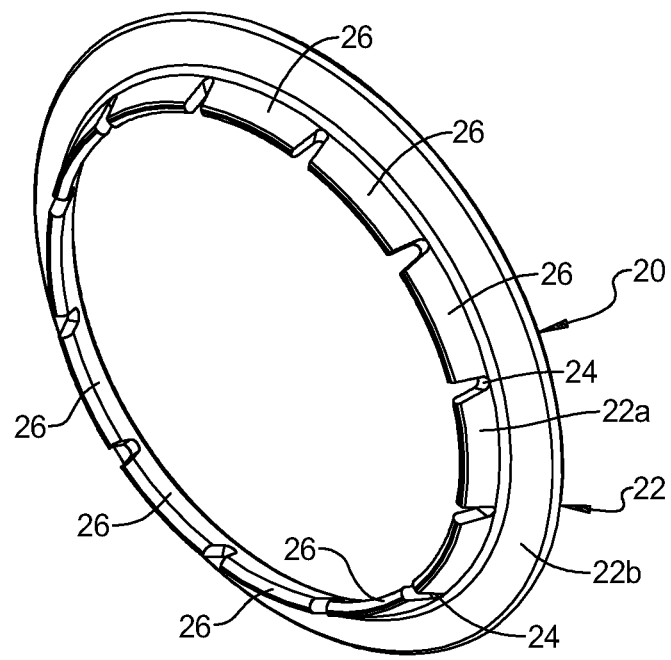
FIG. 3 is a perspective view of a snap ring retainer according to the principles of the present disclosure.

With reference to FIGS. 2A and 3, the snap ring retainer 20 can include an annular ring body 22 having a first portion 22*a* and a second portion 22*b* extending from an end of the first portion 22*a*. The annular ring body 22 can be formed from steel, aluminum, other metals, or plastic. The first portion 22a can be conical in shape having a first angle of inclination A1 and can include a plurality of cutouts 24 extending from the radially innermost edge of the first portion 22a for defining a plurality of spaced tabs 26. The second portion 22b can also be conical in shape and have a second angle of inclination A2 that is greater than the first angle of inclination A1. The first portion 22a is received on the shaft 12 and can engage a shoulder 12b that is spaced from the annular groove 12a. The shaft 12 can include a tapered region 12c adjacent to the shoulder 12b and over which the first portion 22a of the snap ring retainer 22 can be slid, causing the tabs 26 to deform radially outward until the first portion basses by the shoulder 12b and an end of the tabs 26 seat against the shoulder 12b and the second portion 22b engages the snap ring 16. An interior surface of the inclined second portion 22b can engage an outer edge or the snap ring 16 to provide an opposing structure inhibiting radial expansion of the snap ring 16.

Figure 2B:
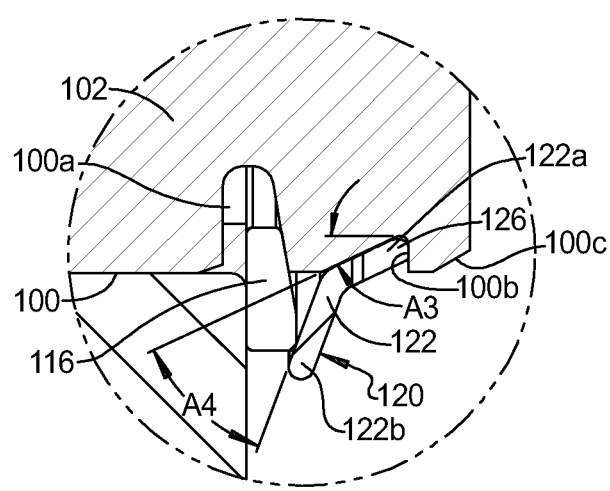
FIG. 2B is a detailed cross-sectional view of the snap ring and snap ring retainer engaged with a housing according to the principles of the present disclosure.

With reference to FIG. 2B, a snap ring retainer 120 is shown for engaging a snap ring 116 received in an annular groove 100a of a bore 100 in a housing 102. In this example embodiment, the snap ring retainer 120 can include an annular ring body 122 having a first portion 122a and a second portion 122b extending from an end of the first portion 122a. The annular ring body 122 can be formed from steel, aluminum, other metals, or plastic. The first portion 122a can be conical in shape having a first angle of inclination A3 and can include a plurality of cutouts 124 extending from the radially outermost edge of the first portion 122a for defining a plurality of spaced tabs 126. The second portion 122b can also be conical in shape and have a second angle of inclination A4 that is greater than the first angle of inclination A3. The first portion 122a is received within the bore and can engage a shoulder 100b that is spaced from the annular groove 100a. The housing 102 can include a tapered region 100c adjacent to the shoulder 100b and over which the first portion 122a of the snap ring retainer 122 can be slid, causing the tabs 126 to deform radially inward until the first portion basses by the shoulder 100b and an end of the tabs 126 seat against the shoulder 100b and the second portion 122b engages the snap ring 116. An exterior surface of the inclined second portion 122b can engage an inner edge or the snap ring 116 to provide an opposing structure inhibiting radial contraction of the snap ring 116.

Figure 4:
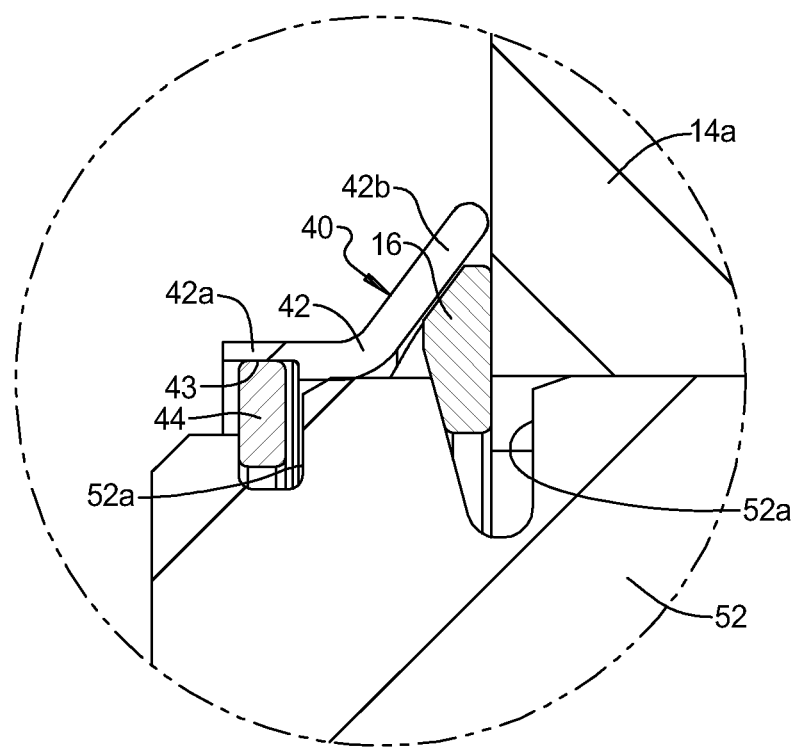
FIG. 4 is a detailed cross-sectional view of a snap ring and snap ring retainer engaged with a shaft according to a second example embodiment of the present disclosure.
Figure 5:
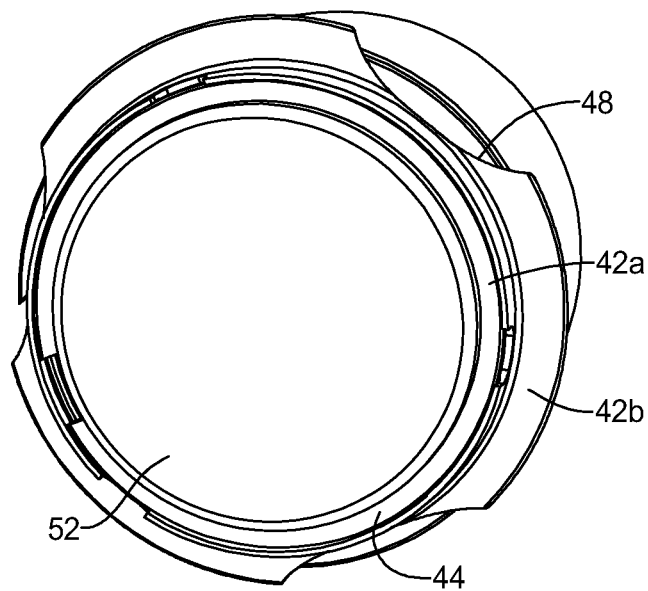
FIG. 5 is a perspective view of the snap ring and snap ring retainer engaged with a shaft according to the second example embodiment of the present disclosure.

With reference to FIGS. 4 and 5, a snap ring retainer 40 according to an alternative embodiment can include an annular ring body 42 having a first portion 42a and a second portion 42b extending from an end of the first portion 42a. The annular ring body 42 can be formed from steel, aluminum, other metals, or plastic. The first portion 42a can be generally cylindrical in shape and having an interior recess 43 extending from a distal end of the first portion 42a. The second portion 42b can be conical in shape. The first portion 42a can be press-fit or otherwise received on the shaft 52 and the recess can receive a secondary snap ring 44 that is received in a secondary annular groove 52b that is spaced from the annular groove 52a that receives the snap ring 16. The secondary snap ring 44 defines a shoulder against which the snap ring retainer 40 is seated while the second portion 42b engages the snap ring 16. An interior surface of the inclined second portion 42b can engage an outer edge or the snap ring 16 to provide an opposing structure inhibiting radial expansion of the snap ring 16. The second portion 42b can include cutouts 48 (FIG. 5) that allow the second portion to flex when pressed against the snap ring to allow for insertion of the secondary snap ring 44 into the secondary annular groove 52b and applying a spring force against the snap ring 16. It should be understood that the example embodiment of FIGS. 4 and 5 can be implemented within a bore of a housing in a similar manner as the example embodiment of FIG. 2B.

Figure 6:
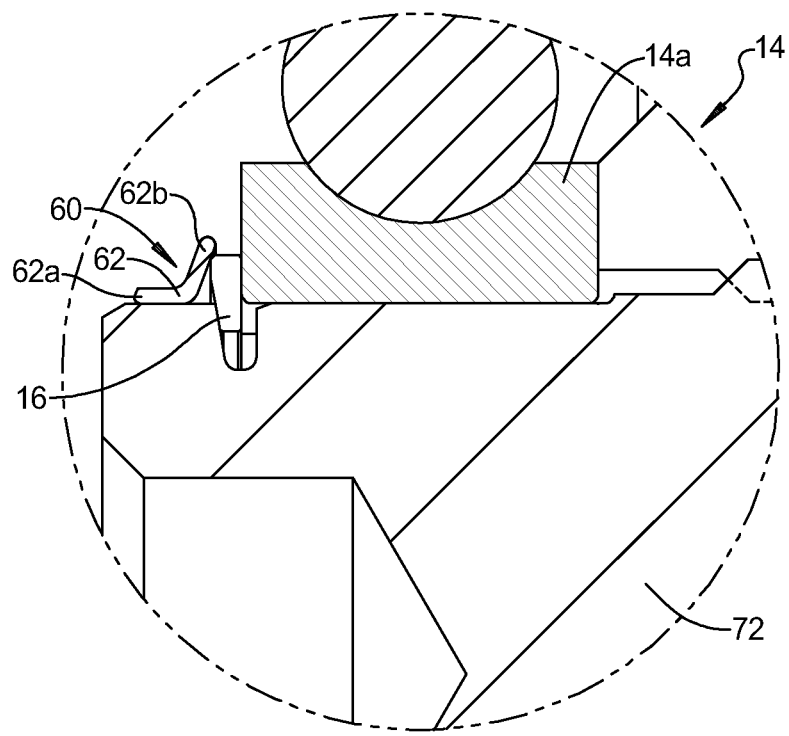
FIG. 6 is a detailed cross-sectional view of a snap ring and snap ring retainer engaged with a shaft according to a third example embodiment of the present disclosure.
Figure 7:
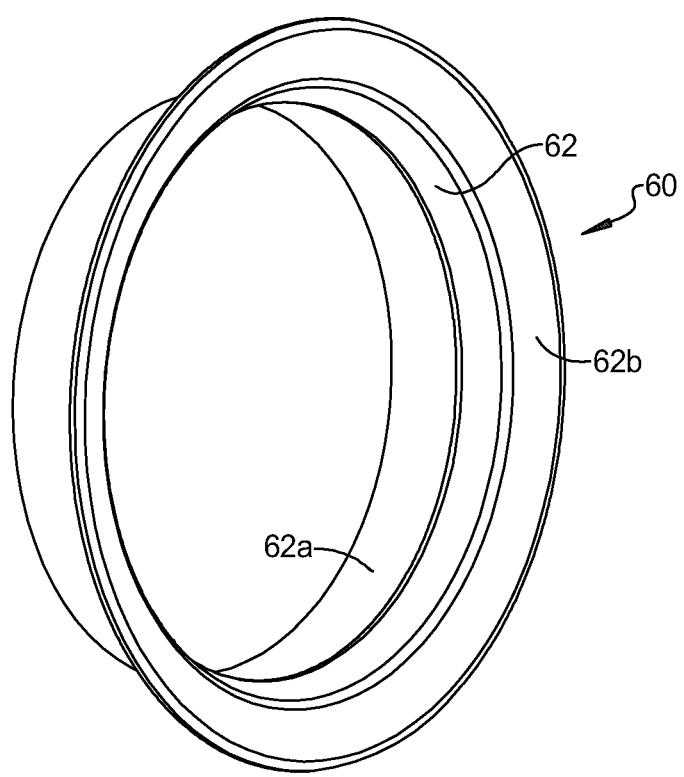
FIG. 7 is a perspective view of a snap ring retainer according to the third example embodiment of the present disclosure.

With reference to FIGS. 6 and 7, a snap ring retainer 60 according to an alternative embodiment can include an annular ring body 62 having a first portion 62a and a second portion 62b extending from an end of the first portion 62a. The annular ring body 62 can be formed from steel, aluminum, other metals, or plastic. The first portion 62a can be generally cylindrical in shape. The second portion 62b can be conical in shape. The first portion 62a can be press fit on the shaft 72. An interior surface of the inclined second portion 62b can engage an outer edge of the snap ring 16 to provide an opposing structure inhibiting radial expansion of the snap ring 16. It should be understood that the example embodiment of FIGS. 6 and 7 can be implemented within a bore of a housing in a similar manner as the example embodiment of FIG. 2B.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:
1. A snap ring retainer system, comprising:
 a first member having an annular groove therein, the first member having an axis of rotation;
 a second member supported by the first member;
 a snap ring received in the annular groove and having a first side engaging the second member and securing the second member to the first member; and
 a snap ring retainer having a first conical portion engaged with the first member and a second conical portion extending radially from the first conical portion and engaging the snap ring on an opposite side from the second member, wherein the first conical portion of the snap ring retainer has a first angle of inclination relative to the axis of rotation and the second conical portion of the snap ring retainer has a second angle of inclination relative to the axis of rotation that is different than the first angle of inclination.

2. The snap ring retainer system according to claim 1, wherein the first member is a shaft and the second member is one of a bearing race, a gear, and a clutch component.

3. The snap ring retainer system according to claim 1, wherein the first member includes a shoulder spaced from the annular groove and engaged by the first conical portion of the snap ring retainer.

4. The snap ring retainer system according to claim 3, wherein the shoulder is formed by a secondary ring received in a secondary annular groove in the first member.

5. The snap ring retainer system according to claim 1, wherein the first member is a shaft of a vehicle drive system and the second member is an inner race of a bearing.

6. The snap ring retainer system according to claim 1, wherein the annular groove has a sloped sidewall that opposes the second member and the snap ring is wedge shaped in cross section with a sloped sidewall that engages the sloped sidewall of the annular groove, the second portion of the snap ring retainer being configured to bias the snap ring toward a bottom of the annular groove.

7. A snap ring retainer system, comprising:
a shaft having an annular groove therein, the shaft having an axis of rotation;
a member engaged with the shaft;
a snap ring received in the annular groove and having a first side engaging the member and securing the member to the shaft; and
a snap ring retainer having a first conical portion engaged with the shaft and a second conical portion extending radially outward from the first conical portion and engaging a second side of the snap ring on an opposite side from the member, wherein the first conical portion of the snap ring retainer has a first angle of inclination relative to the axis of rotation and the second portion of the snap ring retainer has a second angle of inclination relative to the axis of rotation that is different than the first angle of inclination.

8. The snap ring retainer system according to claim 7, wherein the member is one of a bearing race, a gear, and a clutch component.

9. The snap ring retainer system according to claim 7, wherein the shaft includes a shoulder spaced from the annular groove and engaged by the first conical portion of the snap ring retainer.

10. The snap ring retainer system according to claim 9, wherein the shoulder is formed by a secondary ring received in a secondary annular groove in the shaft.

11. The snap ring retainer system according to claim 7, wherein the first conical portion of the snap ring retainer includes a plurality of tabs at an end thereof.

12. The snap ring retainer system according to claim 7, wherein the annular groove has a sloped sidewall that opposes the second member and the snap ring is wedge shaped in cross section with a sloped sidewall that engages the sloped sidewall of the annular groove, the second portion of the snap ring retainer being configured to bias the snap ring toward a bottom of the annular groove.

\* \* \* \* \*